Feb. 5, 1952

G. F. SCHERER 2,584,161

METHOD OF PRODUCING CRACK FREE
HARD FACING METAL COATINGS

Original Filed Dec. 1, 1944

INVENTOR.
George F. Scherer
BY
Strauch & Hoffman

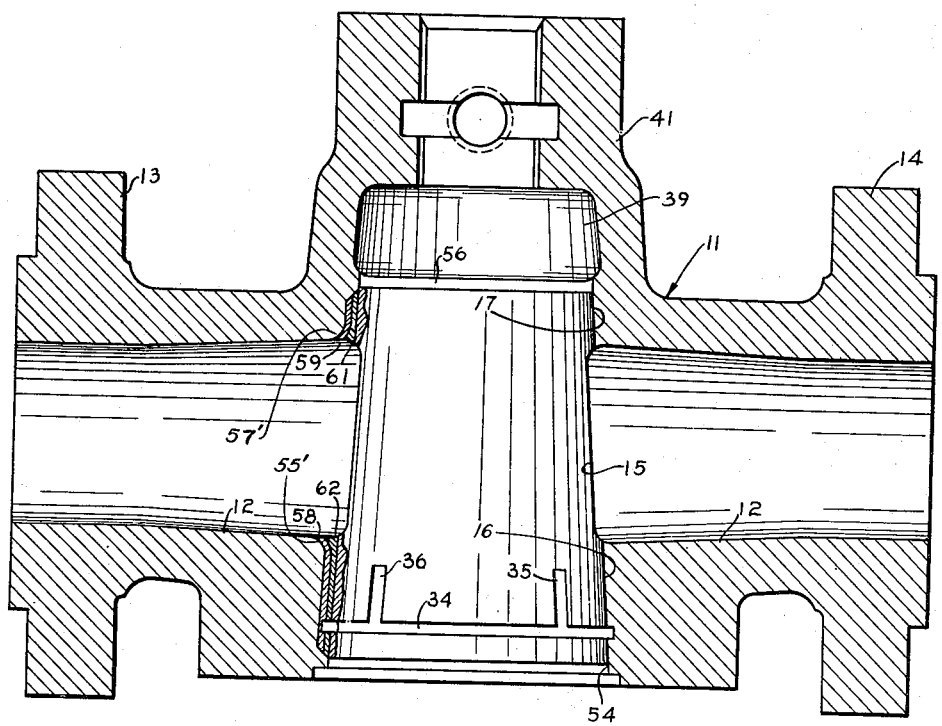
Fig. 3
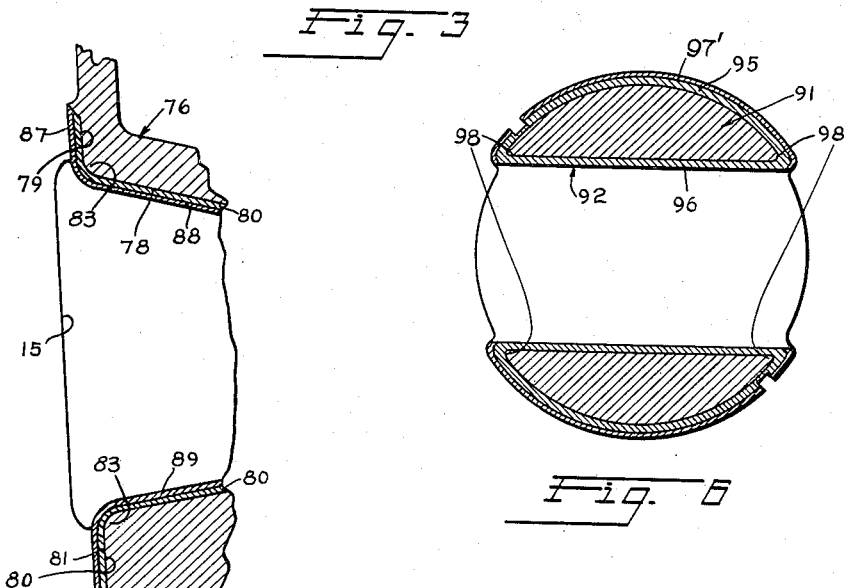
Fig. 7
Fig. 8
INVENTOR.
George F. Scherer
BY
Strauch & Hoffman

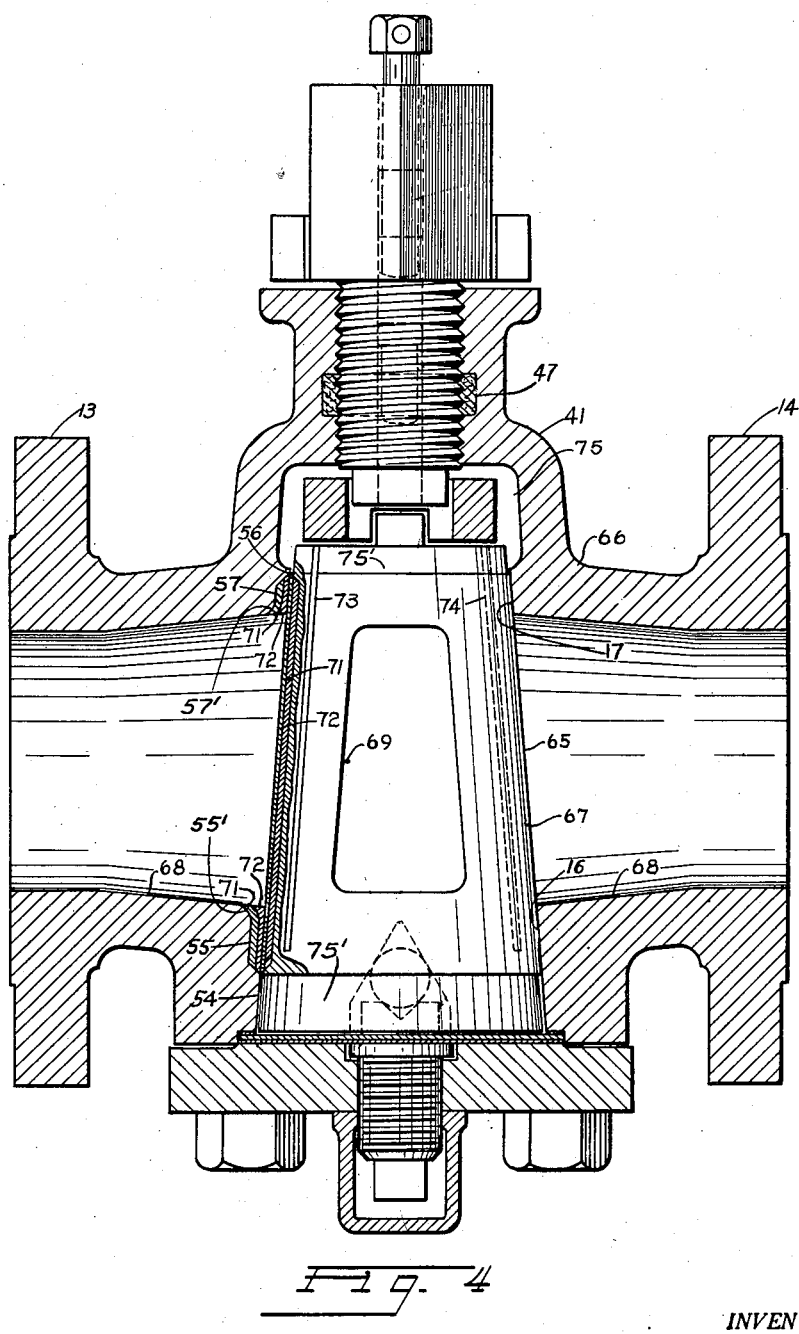

Patented Feb. 5, 1952

2,584,161

UNITED STATES PATENT OFFICE 2,584,161

METHOD OF PRODUCING CRACK FREE HARD FACING METAL COATINGS

George F. Scherer, San Francisco, Calif., assignor to Rockwell Manufacturing Company, Pittsburgh, Pa., a corporation of Pennsylvania Original application December 1, 1944, Serial No. 566,218. Divided and this application August 20, 1945, Serial No. 611,605

4 Claims. (Cl. 117—71)

This invention relates to methods of surface protection of complex structures subject to complex internal and external stresses, and/or high temperatures, such for example as pipe line valves and valve parts, and the articles produced thereby. More particularly the invention is concerned with valve construction having bearing surfaces specially protected against high pressure wear and/or interior surfaces protected against corrosion and erosion by the fluid handled by the line wherein the valve is installed.

This is a division of Serial No. 566,218, filed December 1, 1944, which issued on October 17, 1950, as United States Letters Patent No. 2,525,-831 and which is in turn a continuation-in-part of my co-pending applications, Serial No. 397,556 and Serial No. 484,732, filed June 11, 1941, and April 27, 1943, respectively, both abandoned.

In its preferred embodiment, the invention will be disclosed as applied to lubricated plug valves, although it will be understood that certain phases of the invention are not so limited, as will presently appear in connection with further description of the invention and the scope of the claims.

The usual lubricated plug valve assembly comprises a valve body of complex irregular physical structure provided with an inlet and an outlet for connection with the line and seating surfaces for a rotatable valve plug, with suitable means for holding the plug in the body and for rotating it to control passage of fluid through the body and between the inlet and the outlet. In such valves, the bearing surfaces are relatively large and the pressures and stresses on the seating surfaces are high, especially in tapered plug valves.

Where resistance to corrosion by line fluid is not an important factor, the valve parts are generally made of medium carbon steel, that is steel having about 0.15 per cent to 0.45 per cent carbon content, and when fully annealed these valve parts perform satisfactorily up to about 850° F. For service temperatures in the range of about 750° F. to 1050° F. it is common practice to use a carbon molybdenum steel having about 0.40 per cent to 0.50 per cent molybdenum, in addition to the carbon.

Where corrosion resistance is an important factor it is now common practice to use chromium steels for the valve parts, the amount of chromium varying in proportion to the required degree of corrosion resistance. The most widely used steel in this field is four to six per cent chromium, 0.50 per cent molybdenum steel.

For high temperature valve services, that is about 1000° F. to 1200° F., the creep strength of the steel becomes an important factor and also any tendency toward corrosion is accelerated, so that four to six per cent chrome, one-half per cent molybdenum steel is commonly used even for non-corrosive line fluids at these high temperatures. Where the service temperatures are extremely high, 1200° F. and higher, the tensile strength of the above steels is very low, and it is common to use steel valve parts made of the so-called eighteen-eight stainless steel or sixteen-fourteen-three chrome-nickel-molybdenum alloy steel.

The metal selected for the valve parts should not be subjected to excessive grain growth, to prevent loss of strength in high temperature service. Also, in general, as grain size becomes larger, the metal becomes correspondingly weaker. For example, straight thirty per cent chrome steel containing no nickel, although highly resistant to corrosion, is not practical for valve castings because of excessive grain growth.

Another important inherent physical characteristic which must be considered in selecting the metal for valve parts is the creep strength or the creep resistance of the steel. Creep is accentuated under very high temperature conditions and the creep strength of valve parts should therefore be high for high temperature operation. It is accordingly important that the valve members be of adequate tensile and creep strength, and satisfactory freedom from grain growth under elevated temperatures.

For many services plug valves are commercially satisfactory when the bodies and plugs are made of cast iron, steel, brass and the like. And it has been common practice to harden steel valve plugs to minimize or eliminate galling in common services. Such valves, when subjected to temperatures above the drawing temperature of the steel used, become soft, and galling results, rapidly destroying the valve. The drawing temperatures for the ordinary hardened carbon steel plugs range from about 450° F. to 600° F. Steel valve bodies are not hardened but are annealed or heat treated to secure suitable ductility and grain refinement to provide resistance to fracture.

For difficult services such as extreme conditions of temperature, pressure, corrosion, erosion and the like, the commonly used metals are not satisfactory. Efforts to solve the problems of such difficult services have been made by use of special alloys for the valve bodies and/or plugs. Such alloys are costly and lacking in certain desirable specific physical and chemical properties for particular services, such for example as resistance to galling, corrosion, erosion, retention of strength at high temperature, practicability of fabrication and the like.

No presently known metal or alloy has all of the desirable properties for such difficult services. I have, however, solved these problems practically by providing relatively thin surface coatings integrally bonded by welding them onto base structures having the combined desirable characteristics for any such difficult services.

The usual plug valve bodies have enlarged and apertured end flanges, external webs and other similar formations which give the bodies substantially irregular shape by reason of which mechanical and thermal stresses therein are irregularly distributed, so that different portions of the valve body may expand or contract irregularly under changing temperature and pressure conditions and line stresses. The valve plugs are usually apertured to provide a through port and hence are of such irregular shape as to be also subject to irregularly distributed stresses and strains in service. The non-uniform contraction during cooling of different parts of irregularly shaped valve bodies and valve plugs makes it difficult to effectively apply integrally bonded hard facing thin coatings thereto without serious rupture of the coatings which impairs their effectiveness.

For hard coated valve seating surfaces on high temperature service, a surface with a minimum hardness of about 50 Rockwell C. scale and non-galling properties under operating conditions is desirable. Proper selection of a non-galling coating material involves several major considerations. One of these is that it must withstand the bearing pressures encountered in service. Further it must resist seizing and galling to a high degree and provide low friction between bearing surfaces under service conditions of pressure and temperature. This is a particularly difficult problem under high temperature conditions of service where the lubricant becomes excessively thinned. In my Patent No. 2,208,394 issued July 16, 1940, I have described and claimed the coating of valve bearing surfaces with a cobalt-chromium-tungsten alloy of the type known in the trade as "Stellite." In said patent, the hard facing alloy coating is bonded directly to a carbon steel valve seat by fusion welding methods in use at the time which resulted in undesirable dilution of the coating when applied in reasonable and practical thicknesses. Such dilution is most difficult to avoid at the sharp edges of the members of the base structures. Such dilution destroys or lowers to undesirable values the inherent hardness of the coating material and its corrosion resistance. This is particularly important because of the limitations in thickness of coating imposed by structural considerations and by high costs of the coating materials. Nickel-chromium-boron alloys such as those known to the trade as "Colmonoy" are also satisfactory for non-galling valve seating surfaces when properly applied in accordance with my present invention. Stellite, because of its anti-frictional characteristics and because it machines more easily is generally preferable to Colmonoy. However, Stellite is not as suitable for certain services in which Colmonoy has greater corrosion resistance.

The main plug valve structural members such as the bodies, plugs, covers and the like cannot practically be made of solid Stellite, Colmonoy, or like alloys, because they lack certain necessary physical characteristics such as strength and ductility, are too expensive, and much more difficult to machine than steel. The desirable characteristics lacking in such alloys are included in the valve structures of the present invention by bonding the alloys integrally to steel base supporting structures. However, in applying such hard facing materials to such steel supporting structures, considerable difficulty is generally encountered due to the fact that the supporting members are complex structures, whereas the coating material is a hard non-ductile substance which must be applied in fluid condition, and must be bonded to the base metal with a limited fusion zone to preserve the inherent characteristics of the coating layer.

Certain steels having desirable corrosion resisting properties for use in plug valves for particular services have critical transition ranges in which reversal of linear dimensional change occurs at temperatures through which the base structures must pass as they cool after coating with resultant serious cracking of the hard facings directly applied to such structures. For example, four to six per cent chrome steel commonly used for valve parts has such a transition range at about 500° F. When molten hard facing material such as "Stellite," which has a melting point of about 2300° F., was applied to the seating surfaces of plug valves of this material by prior methods, cracks formed in the coating, and the conclusion was reached that such hard facing coatings could not be successfully applied to valve parts of such material.

In view of the above, it is a major object of the invention to provide a novel valve construction wherein valve parts of complex structure are provided with extremely hard, long-lasting, thin, bearing pressure resistant surface coatings which retain their hardness and smoothness under all temperature, pressure and other conditions encountered during normal operation, and novel methods of making the same.

A further object of the invention is to provide a novel metal valve construction wherein internal surfaces thereof are lined with metal which is resistant to corrosion and/or erosion by line fluid, and novel methods of applying such lining metal.

A further object of the invention is to provide a novel method of bonding thin layers of protective metal coatings onto valve seats and other base metal surfaces so as to avoid excessive dilution with the base metal.

It is a further object of the invention to provide a novel method of valve construction wherein a metal valve seat surface is provided with a thin uniform layer of hard facing metal overlying an intermediate, preferably thicker, stress absorbing and distributing layer of relatively ductile metal. Pursuant to this object, this intermediate layer may be an extension of a previously applied lining of corrosion resistant ductile metal lining within the valve.

It is a further object of the invention to provide a novel method of coating a valve part of irregular cross-section having a valve seat of appreciable area, with a permanently bonded coating of a ductile or stretchable metal such as stainless steel, Monel metal or nickel and a thin top bearing face coating of a hard metal such as a cobalt-chrominum-tungsten alloy or a nickel-chromium-boron alloy.

Further objects of the invention will presently appear as the description proceeds in connection with the appended claims and the annexed drawings wherein:

Figure 3 is a substantially diametric section through the valve body of the assembly of Figure 1, illustrating the irregularly varying thickness wall cross sections of the valve body, and also illustrating the coated valve seat and the lubricant groove arrangements of this valve assembly;

Figure 4 is a partial assembly of a further coated plug valve and a body arrangement which is especially designed for higher temperature service;

Figure 5:
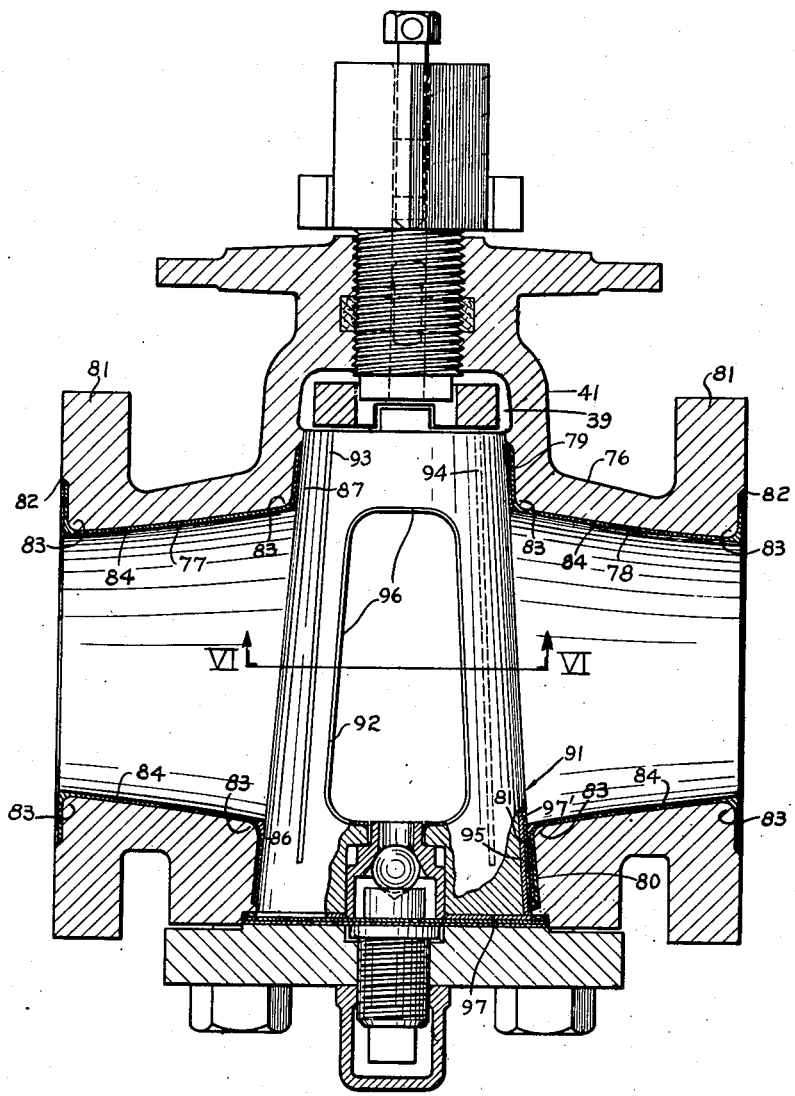
Figure 5 is a transverse section through a lubricated plug valve assembly designed for high temperature corrosive fluid handling wherein the interior of the valve body is illustrated as coated with a corrosion proof lining, and the valve seat is also covered by a layer of hard facing material.

Figure 6 is a section taken along line 6—6 of Figure 5, illustrating further, and exaggeratedly for purposes of clarity of disclosure, the manner in which the plug valve is coated according to this embodiment of the invention; and Figure 7 is a partial section similar to one side of Figure 5, wherein the corrosion resistant lining of the valve body throat is provided with an additional hard facing lining for resisting abrasive fluid wear.

For services where only the seating surfaces are the critical areas it is sufficient to coat these surfaces with a hard facing material. Where the valve is designed or intended for handling highly corrosive materials, such, for example, as dilute sulfuric acid, I apply a corrosion resistant coating to the entire exposed interior of the valve body and to the exposed plug surfaces and other parts. The present invention therefore contemplates making the valve members of steels having the desired physical properties and coating the critical surfaces of valves which are subject to wear and/or corrosion with integrally bonded layers of metal or alloy having the required wear and/or corrosion resistance for specific services.

In applying hard coating material such as "Stellite" and "Colmonoy" to surfaces of steel having a transition range where contraction of the cooling steel changes temporarily to expansion for a small region of temperature drop before resuming normal contraction, I find it preferable to provide an intermediate layer of other metal between the hard facing layer and the base metal. Examples of such intermediate coating metals are stainless steel, nickel and Monel metal which are ductile for a purpose to be explained.

An alloy steel such as four to six per cent chrome steel, if coated at a base metal temperature above the transition range, may cause cracks to develop in the hard facing layer. The transition range of four to six per cent chrome steel being at about 500° F., coating temperatures preferred for application of "Stellite" or "Colmonoy" produce uncontrollable cracking of hard face coating applied directly thereto. To remedy these difficulties according to the invention, I have found it desirable to coat the bearing seats and surfaces of such low transition range steel valve parts with an intermediate coating of a metal or alloy which in the range of temperatures encountered in coating has a high ductility relative to that of the valve base metal or the hard facing material depended upon to give the required bearing pressure resistance, or both, sufficiently thick to absorb the stresses resulting from changes in temperature of mechanically applied stresses. For example, I preferably use an intermediate layer of metal of high ductility as measured by its physical characteristic of fifty-five per cent to sixty-five per cent elongation, between a base metal of eighteen per cent to twenty-two per cent elongation and hard facing material having negligible elongation under the same pull or stress over a two-inch length of a standard test specimen. An intermediate coating of this type, I have found is a practical necessity in applying hard facings to four to six per cent chrome steel valve parts for uniform results. This intermediate coating is usually a relatively ductile alloy or metal, such as nickel, Monel metal or stainless steel, and its primary function is to elastically act to absorb and cushion the differential and localized stresses set up during the relative contractions of the overlying hard facing coating and the valve metal directly beneath the intermediate coating, and prevent harmful transmission of such stresses to the hard face coating.

In general the materials which possess the necessary qualities of ductility for intermediate layers for low transition point steel are corrosion resistant to most line fluids. Hence where an intermediate layer is provided for its corrosion resistance, as in coating medium carbon steel, its inherent ductility is advantageous to absorb stresses during cooling and insure against harmful cracking. And where the intermediate layer is provided for ductility its inherent corrosion resistance provides that valuable added function to the coating as a whole.

Where it is desired to provide a more or less completely corrosion resistant valve as will later be described, the lining material initially deposited upon the interior of the valve body and on the plug for providing corrosion resistance is also deposited over the valve seats where it also functions as the intermediate stress absorbing layer between the valve body and the hard face coating. In general, I prefer to use a stainless steel intermediate coating because it is less expensive and more available than the other satisfactory materials, and for the purposes of the invention I prefer specifically stainless steel of the grade commonly known as 18—8 which contains about eighteen per cent chromium and eight per cent nickel. This steel is highly ductile and corrosion resistant and is easily applied to the steel valve seat surfaces as by arc welding methods. Another useful metal for the purpose is the low carbon stainless steel known as type 304 which has a maximum carbon content of .08. The nickel-molybdenum-iron alloy known as Hastelloy B, which is corrosion resistant to most chemicals encountered in commercial processes, is sufficiently ductile to serve as such an intermediate layer. This provides a very efficient and commercially practical manner of making a corrosion and wear resistant valve assembly.

Preferably the intermediate coating is somewhat thicker than the bearing face coating to be later applied, so that any dilution thereof by melted steel from the valve part may be confined to a relatively thin layer adjacent the valve part.

The matter of avoiding dilution is therefore less important in applying the thicker intermediate coating than in applying the wear surface coating, but since these coating materials are expensive it is desirable to observe cautions to avoid such excessive dilution and hold the intermediate layer to minimum thickness.

Where the intermediate coating is employed for its stress absorbing characteristics only, it may be applied by any suitable welding operation such as arc welding. However, where it is to serve as a supplementary corrosion resistant coating, it is preferably applied by an oxyacetylene flame in a reducing atmosphere and in such manner as to avoid oxidation and excessive dilution. In all cases, the intermediate coat is so applied as to produce as little fusion of the surface coating as possible so as to maintain dilution at a minimum.

It is not necessary to pre-heat the valve part before applying the intermediate coating, as the coating is sufficiently elastic to absorb the differential cooling stresses without cracking.

After the intermediate coating has been applied, the outer coating of hard face material is applied directly to the intermediate coating. If desired, the intermediate coating may be machined prior to application of the outer coating, as for obtaining a surface of required size, shape or smoothness. During this stage of the process, the intermediate coated valve part is pre-heated in a reduced atmosphere, being positioned in a reducing furnace while the hard facing material is flowed on by means of a neutral flame of an oxyacetylene torch to provide a relatively narrow bonded zone and a substantially undiluted outer face. The finished product is a valve part having two coatings on the valve seat surface, an intermediate coating of ductile stretchable metal such as stainless steel directly on the machined valve seat, and an over-coating of hard facing metal such as Stellite or Colmonoy directly on the stainless steel or similar coating. The two coatings are permanently bonded to the valve part and to each other by the manner of their application.

In actual service, besides preventing cracking and deformation of the outer hard surface layer during application, the intermediate layer also serves as a substantial cushion between the outer hard facing layer and the steel valve seat for absorbing stresses which otherwise may crack the outer hard surface layer. Another valuable function of the intermediate layer is that, even though the hard facing material as applied thereover may not be sufficiently dense or of such quality as to be corrosion resistant, the material of the intermediate layer may be resistant to action of the fluid being handled by the line and thereby prevent corrosive deterioration of the valve seat therebeneath.

*Corrosion resistant lining*

For some installations and especially in the making of aviation gasoline for example, the problem of handling extremely corrosive materials is acute. In accordance with my present invention I am able to suitably corrosion-proof the finished and unfinished valve interiors, and other parts exposed to line fluid and at the same time provide the requisite bearing surfaces required for plug valve operation. In general, the metal or alloys chosen for the corrosion resistant lining of the valve parts must be correlated to the fluid being handled. For example, materials which are resistant to hot caustic solutions may not be resistant to hydrofluoric acid. I have found that the nickel-molybdenum-iron alloy known in the trade as Hastelloy B which is highly resistant to corrosion by most organic acids, and sulfuric, hydrofluoric, hydrochloric and other inorganic acids and the highly corrosive materials encountered in the isomerization of butane during aviation gasoline processing, has been proven highly satisfactory and is contemplated in the preferred embodiment of the invention.

Where such corrosion proofing is required, it is usually extremely practical to extend the corrosion resistant lining from the unfinished surfaces of the body over the valve seat. The valve seat may then be provided with a hard facing coating, as most of the materials which are satisfactory for corrosion-proof coating of the unfinished valve surfaces are sufficiently ductile to provide excellent intermediate coatings.

Corrosion resistant linings and coverings of materials such as Hastelloy B are preferably applied by means of an atomic hydrogen welding process which gives the required high coating temperature without extensive dilution of Hastelloy B or absorption of carbon, pre-heating not being necessary during application of this material, as Hastelloy B is quite ductile and gives rise to no practical problems of cracking due to differential surface cooling after application. Furthemore, since the coating of Hastelloy B is preferably appreciably thicker than the hard facing coating, a relation which holds as to substantially all intermediate layers, a greater thickness of bonding layer can be provided than when applying hard facings, without sufficient dilution or absorption of carbon to substantially affect corrosion resistant properties of the exposed surfaces.

Where a corrosion proof lining such as Hastelloy B is employed in a valve, the entire corrosion proof lining should be applied to the interior of the valve body or on the valve plug before the hard facing material is applied over the portions of the intermediate lining coating the valve seat. Although the pre-heating temperatues for application of the Hastelloy B are lower than those required for applying hard facing materials such as Stellite or Colmonoy, if some portions of the valve parts should be corrosion proofed after hard facing material had been applied to the valve seat, danger of cracking the hard facing results because of the non-uniform temperatures prevailing when applying the Hastelloy B by torch without pre-heating in a furnace.

For certain corrosion resistant services Monel metal, brass, silver and like coatings may be bonded to the valve base structures having substantially undiluted outer surfaces which may be machined and used directly as the valve seating surfaces, without use of hard facings. Such valves are desirable for services where the physical characteristics of the corrosion resistant metal will not permit the production of satisfactory base structures, high cost, lack of adequate strength, inability to produce nonporous or sufficiently dense castings without excessive casting losses and the like. In addition to providing corrosion resistance, my improved coating methods permit use of base structures which uncoated would be rejected as valve parts, by covering and sealing defective and porous surfaces.

According to another phase of the invention, valves which are employed in handling line fluids containing abrasive materials, such as mud valves used in oil well drilling and cement valves, are provided on their throat and other internal surfaces in the path of abrasive fluid with protective coatings of hard facing materials such as above described to resist abrasion. This may be done whether or not the valves are also provided with corrosion resistant linings and wear resistant bearing surfaces.

Figure 1:
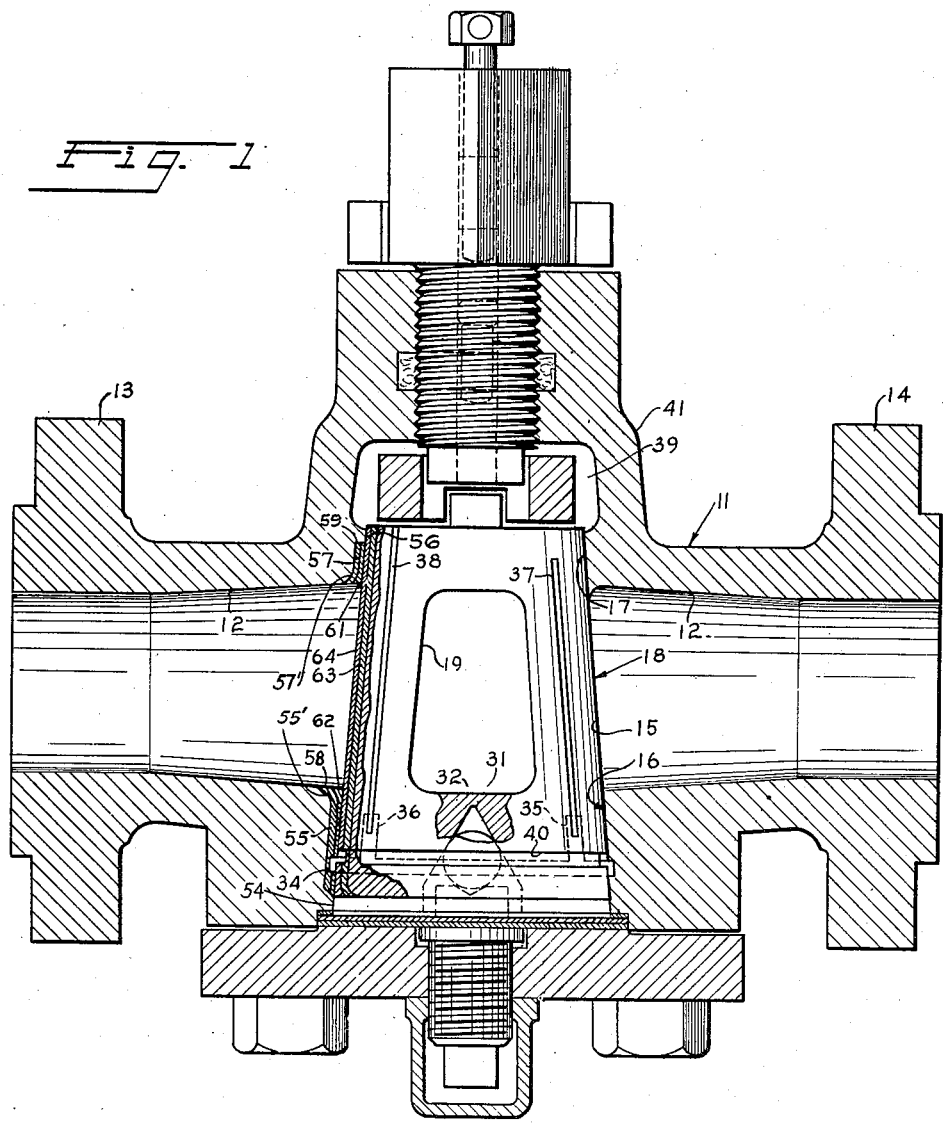
Figure 1 is an elevation chiefly in longitudinal section through a lubricated plug valve assembly incorporating a preferred embodiment of the invention, and illustrating in exaggerated thickness the coated valve body and plug surfaces.
Figure 2:
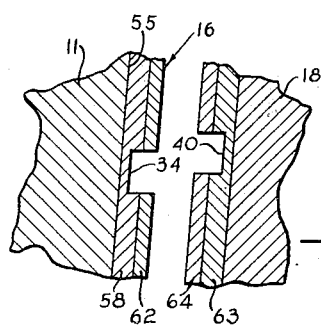
Figure 2 is an exploded enlarged fragmentary sectional view illustrating the intermediate and hard face coatings on the plug and body of Figure 1.

Referring now to Figures 1 through 3, which illustrate a preferred embodiment of the invention a valve body 11 is provided with a longitudinal through bore 12 adapted to be coupled in fluid communication with pipe lines at opposite ends as by end flanges 13 and 14.

Intermediate its ends, valve body 11 is formed with a tapered bore 15 the axis of which extends at right angles to the axis of through bore 12. Bore 15 is of course interrupted where bore 12 intersects it, and the valve body interior is such that continuous annular tapered internal valve seats 16 and 17, as indicated at the right side of Figure 1, are formed. Details of the final valve seat coating, illustrated diagammatically in exaggerated form only at the left side of Figure 1 for clarity of disclosure, will later be described. The right side of the body seats 16 and 17 is shown uncoated but it will be understood are finally coated as illustrated on the left side of Figure 1.

Continuously annular valve seats 16 and 17 are of considerable bearing surface area and are adapted to receive in bearing engagement corresponding tapered exterior surfaces of a tapered plug valve 18 having a diametral through port 19. Plug 18 is rotatable and may be selectively disposed in the position illustrated in Figure 1 where the plug cuts off flow of fluid through the valve, or in a position at right angles thereto where port 19 connects opposite sides of bore 12.

Adjacent the lower end of plug 18, seating surface 16 is formed with a continuous circumferential groove 34 which is relatively narrow and functions as a lubricant distribution groove. Also formed in the surface of seat 16 are a plurality of longitudinally extending similar short wall grooves 35 and 36 which are in communication at their lower end with groove 34 and terminate at their upper ends short of the intersection between bores 12 and 15. Although only two of these grooves are illustrated, there are preferably four of them symmetrically disposed on opposite sides of the port 19.

Tapered plug 18 is formed with a plurality of longitudinal surface grooves, two of which are illustrated at 37 and 38 flanking one mouth of port 19, it is being understood that similar longitudinal grooves are provided at the other side of the port. Both grooves 37 and 38 have their lower ends disposed to afford communication with short grooves 35 and 36 only when the valve plug is in closed position as illustrated in Figure 1, and the upper end of one of the grooves of each pair, such as groove 38 in Figure 1, is always in fluid communication with a lubricant reservoir space 39 formed in a boss 41 extending upwardly from the valve body. Below, and spaced from the lower ends of grooves 37 and 38, the surface of plug 18 is formed with a narrow circumferential groove 40 facing groove 34. The lubricant circuit in these grooves will later be described.

The construction and operation of the lubricated valve assembly as illustrated is generally similar to that described in said Nordstrom Patent No. 2,204,440, so that further description thereof is believed unnecessary. This construction is described to illustrate especially the high bearing pressures encountered in lubricated plug valve assemblies.

The left side of Figure 1 is broken away along the edge of the plug for exaggeratedly illustrating the regions wherein the valve seats 16 and 17 are provided with coatings of hard facing material for resisting and reducing the high pressure bearing wear to which they are subjected during all conditions of operation of the valve.

The valve body is machined to provide valve seats 16 and 17, and then valve body seat 16, except for a narrow annular land 54 at the bottom above shoulder 28, is machined away to provide a shallow annular recess 55. Similarly valve body seat 17 is machined away to provide an annular recess 57 of the same depth, except for a narrow annular land 56 at the upper end of seat 17. Casting corners 55' and 57' are rounded prior to coating to avoid excessive dilution of the coating.

The depth of recesses 55 and 57 is substantially one-sixteenth to one-eighth of an inch, depending upon the coating thickness to be provided, and it is contemplated that material deposited within recesses 55 and 57 will build up these regions of the bore 15 to its required size by replacing cut-out body metal. The edges of the body surrounding the port openings into recesses 55 and 57 are preferably rounded as illustrated at 55' and 57' to minimize danger of overheating during the coating operation and dilution of the coating material.

Where the valve body and plug are made of four to six per cent chrome steel, because of its critical range, an intermediate coating is preferably employed and, after recesses 55 and 57 have been formed to the required size, the material which is to comprise the intermediate layer at the valve seat surfaces is deposited in a thin uniform integral coating within the recesses. I preferably employ a good grade of stainless steel, usually of the eighteen-eight type above-mentioned, for this intermediate coating. This stainless steel coating is deposited in recesses 55 and 57 by my improved coating operation, hereinbefore described in detail. No pre-heating of body 11 is required during this operation since stainless steel is elastic enough to absorb the cooling stresses without cracking.

After the stainless steel intermediate coating has been deposited up to a thickness occupying about two-thirds of the depth of the recesses 55 and 57, the valve body containing the intermediate coated valve seat is pre-heated in a reducing atmosphere to a temperature of about 1350° F. Although this is considerably above the transition range of the steel, the intermediate layer provides a cushioning effect which prevents substantial undesirable cracking of hard facing as the coated body cools down through the critical range of the base metal. Then hard facing material, such as Stellite or Colmonoy, is deposited in accordance with my improved method, preferably using an oxyacetylene torch to heat the valve body and flow on the facing metal on each of stainless steel intermediate layers 58 and 59 so as to completely cover those layers and build up the thickness of the deposited material in recesses 55 and 57 until the required size of bore 15 is obtained providing hard facing layers indicated at 61 and 62 bonded to the intermediate layers with narrow fused bonding zones. The thickness of the hard facing material may be materially less than the thickness of the intermediate layer.

By applying the hard facing layers 61 and 62 in accordance with my improved methods substantially uniform annular coatings undiluted to any appreciable extent by the stainless steel intermediate coatings are provided and the outer surfaces of these coatings retain the hardness and desirable bearing characteristics of the hard facing material prior to the coating operation.

As illustrated in Figure 2, groove 34 may be made deeper than the hard face coating 62 if necessary or desirable because no bearing wear is taken by the interior of groove 34 in operation, but should not cut into the fusion or bonding area of the intermediate coating 58 if the corrosion protection of the intermediate coating is of importance in the groove. Short grooves 35 and 36 are at the same time cut into the valve seat 16 of the body.

Lands 54 and 56 are preferably ground away for a small annular region to clear the corresponding end of the plug, so that there will be no bearing contact between the plug and these lands. The relief provided at these areas may be of the order of two-hundredths of an inch in the valve shown in Figure 1, in which the upper valve seat 17 is a continuous smooth face about three-quarters of an inch in axial extent, while lower valve seat 16 is a continuous smooth face about an inch and three-quarters in axial extent, except for groove interruptions.

Plug 18, after casting and preliminary machining to the required size for fitting bore 15, is then cut away uniformly to reduce all its diameters about one-eighth of an inch and preferably the edges of the plug port are rounded for the reasons hereinbefore set forth. The plug surface is then coated by my hereinbefore described method with an intermediate continuous layer of stainless steel 63 and a hard smooth facing layer 64 of Stellite, Colmonoy or the like. The combined thickness of the coextensive layers 63 and 64 along the tapered side surfaces of valve plug 18 builds the valve plug diameters to the size required to provide a suitable fit within the coated valve body bore 15 after machining, grinding and lapping.

After valve plug 18 has been coated, the hard faced surface is machined or ground to size and grooves 37 and 38 are cut in the coating, care being taken that the grooves are not cut into the bonding zone of the intermediate coating for services where protection of the bottom of the grooves by a layer of corrosion proof stainless steel is desirable. The plug is then suitably lapped into the body, preferably under the conditions of service so the plug will properly seat in the body in operation.

I have thus provided a coated valve seat construction wherein the tapered surface of the valve plug and the correspondingly tapered surfaces of valve body present to each other smooth bearing areas which are extremely hard and which have not substantially deteriorated by dilution during the coating process. The provision of the ductile stainless steel undercoat provides an elastic stress absorbing and distributing medium for preventing cooling stresses in the plug and body from rupturing, cracking or otherwise weakening or deteriorating the physical structure of the hard facing coatings 61, 62 and 64, and provides a fluid impervious valve seat coating in the event that there may be small apertures in the hard facing; and the valve assembly so made gives remarkably and unexpectedly good wearing qualities under tremendously high service pressure and temperature conditions.

Figure 4, which other than below indicated is the same as Figure 1, illustrates a further embodiment of the invention which is designed for a higher temperature service than the valve above described for Figures 1-3, which is mainly designed for temperatures up to about 750° F.

The valve plug 65 is shown in assembly with an irregularly shaped valve body 66 having a tapered bore 67 for receiving valve plug 65 and intersecting a through bore 68 with which the port 69 of the valve is adapted to be aligned when the valve is open. When four-four-six chrome steel is desirable for the service involved, the tapered valve seats at the lower and upper ends of the bore 67 are formed with continuously annular recesses of a depth for receiving the intermediate facing coating 71 and hard facing coating layer 72, like the coatings provided in recesses 55 and 57 in Figure 1. The valve plug 65 is also provided with the intermediate coating 71 and hard face coating 72. For services in which medium carbon steel is satisfactory, the intermediate coating may be eliminated and the hard facing applied directly to the base parts as hereinbefore set forth.

In this type of valve which is designed for relatively high temperature service, plug 65 is provided with two longitudinal grooves only, as indicated at 73 and 74 so positioned that they do not cross the body ports in the opening and closing movements of the plug. Both of these grooves have their upper ends communicating with the lubricant space 75 so that when lubricant pressure is built up in space 75 the lubricant is forced down through the grooves 73 and 74 so as to be available for lubricating and jacking the plug. Since at extremely high temperatures the normally used lubricants become very thin, the provision of additional distribution grooves is not essential for lubricating purposes in their normal operation, and the foregoing groove arrangement provides desirable jacking and lubricant distribution with minimum loss of lubricant into the line.

The manner of depositing the coatings at 71 and 72 of Figure 4 is preferably the same as in Figure 1. However, as there are no circumferential grooves in the lubricant system of this valve of Figure 4, a shorter band of bearing facing material may be used thereby effecting a saving in hard facing material. In this form of the invention it will be noted that the hard facing coating stops short of both ends of the plug, providing end zones or bands of steel 75' which serve as thickness guides in applying the facing material and also help to bond the coating ends in place minimizing cracking tendencies. These steel plug bands or areas or the mating body areas are preferably relieved slightly so they will not bear on the body seating surfaces.

Figures 5, 6 and 7 illustrate a valve body and plug assembly in accordance with my invention for high temperature and highly corrosive service provided with interior surface linings for protection against corrosion by the line fluid handled by the valve, as well as bearing wear resistant valve seats.

Referring to Figure 5, valve body 76 is of the same general construction as the valve body 11 of Figure 1, being provided with a through bore intersected at right angles by a tapered plug bore having opposite ends formed with continuously annular tapered valve seats adapted to seat a tapered plug valve. The opposite throats of the through bore are preferably flared as illustrated at 77 and 78.

Valve body 76, which is preferably of medium carbon steel, is formed with upper and lower tapered annular recesses or surfaces 79 and 80 at the regions where valve body 76 is to be hard faced. The end flanges 81 of valve body 76 are provided with annular recesses 82 surrounding the entrance and exit openings of the through bore. The sharp edges at the passage ends are rounded at 83 to avoid overheating and dilution as hereinbefore pointed out. The throat sections 77 and 78 of the body need not be machined or finished to receive the coating material. So prepared, valve body 76 is ready to receive an internal coating or lining 84 of corrosion resistant material, which, for example, may be the nickel-molybdenum-iron alloy known as Hastelloy B which is suitable for most extreme corrosion resistant purposes.

This lining is applied in the manner hereinbefore set forth, preferably without pre-heating the valve part because Hastelloy B is suitably ductile. As this alloy is not readily reduced, use of atomic hydrogen welding torch gives excellent results particularly free from oxidation. This type of coating can also be satisfactorily applied by a conventional electrical arc welding process for certain purposes. Whatever welding operation is employed, the coating temperatures should however be kept to a minimum to minimize dilution of the coating layer.

In the process of corrosion proofing the valve body interior, the Hastelloy B lining 84 is applied continuously and integrally to the front flange recesses 82, throughout the throats 77 and 78 and also in the bottoms of recesses 79 and 80. It is usually not necessary to line the lubricant chamber at the small end of the plug with corrosion resistant material because of the protection afforded by the lubricant, but in general all surfaces likely to be exposed to line fluid are coated. I thus provide in valve body 76 a thin smooth corrosion resistant lining 84 which is integrally continuous over all the valve body surfaces adapted to or likely to encounter the line fluids. This coating, in addition to protecting against corrosion, covers up and seals porous sections and body flaws that uncoated would cause rejections of the casting for valve use.

For practical purposes, in a valve of the type illustrated, I have found that a lining of Hastelloy B of about one-sixteenth of an inch in thickness gives very satisfactory corrosion proofing results. Recesses 79 and 80 are at least about an eighth of an inch in depth to permit application of annular layers of hard facing material as indicated at 86 and 87. These layers of hard facing material for high temperature or pressure corrosive services preferably are alloys like Stellite or Colmonoy as hereinbefore set forth. The portions of the Hastelloy lining which lie in recesses 79 and 80 function as intermediate coating layers in this construction and are equivalent to layers 58 and 59 in Figure 1, for example.

The corrosion resistant lining 84 is varied for the particular services encountered in practice. It may, for example, be a high chromium steel such as a twenty-seven per cent chromium steel alloy which exhibits the required ductility properties and is used in place of Hastelloy B where a lining which is non-absorbent with respect to hydrogen is desired. It may also, for particular services, be brass, Monel metal, bronze, silver and the like, and may or may not be hard faced at the bearing surfaces depending upon the nature of the service and the coating. In all cases, however, the coating is fusion bonded to the coated surfaces with a relatively narrow fusion bonding zone and an outer surface layer of the coating not sufficiently diluted by the base metal to substantially impair its corrosion resistance for practical purposes.

While I have illustrated in Figure 5 the throats 77 and 78 as coated only so as to be corrosion resistant, if fluids are handled by the valve which contain granular or abrasive materials, the hard facing coating may be extended from the bearing seats to cover such areas of each throat as are exposed to the impact or passage of the abrasive material to thereby increase the wear life of the valve, as illustrated at 88 and 89 in Figure 7.

Plug 91 within the tapered bore of Figure 5 is formed with a through port 92 adapted to register with throats 77 and 78. Since this particular valve assembly is adapted for extremely high temperature services, there are no circumferential grooves in the plug or body, and only two longitudinal grooves 93 and 94 are provided in the plug for conducting lubricant there along as in Figure 4.

As illustrated in Figures 5 and 6, all edges to be coated are preferably rounded off and a continuous integral corrosion resistant coating 95, such as Hastelloy B, extends over the entire tapered side walls of plug 91 and integrally interiorly of bore 92 at 96, and also extends integrally over the lower end of the plug as indicated at 97 to protect it against the leakage of corrosive line fluid around the lower end of the plug. The bearing or seating surfaces of plug 91 are also provided with integral hard facing coating 97' of Stellite, Colmonoy or the like, similar to coating 64 in Figure 1 in the manner hereinbefore set forth. The normally sharp edges are preferably rounded off, as illustrated, for example, at 98 in Figure 6, before applying the coating, for the reasons hereinbefore given. The portions of coating 95 which lie beneath the hard facing function also as intermediate layers similarly to layer 63 in Figure 1.

The feature of providing corrosion resistant linings for the plug and valve body surfaces likely to encounter corrosive line fluids may be used in any type of valves, particularly lubricated plug valves. For example, the interior surfaces of the valve body illustrated in Nordstrom Patent No. 1,781,821 may be provided with an integral lining of Hastelloy B similarly to the valve body of Figure 5 herein and lining the lubricant chamber at the small end of the plug. The valve plug of Patent No. 1,781,821 differs over the valve plug of said Figure 5 in that the former has a rigid operating stem at its larger end extending through a resilient packing and gland arrangement for external access by a wrench or the like, and the external corrosion resistant lining on the plug extends over the large end of the plug similarly to the showing at 97 in Figure 5 and thence over the surface of the stem portion extending through the packing. The packing rings in Patent No. 1,781,821, as well as the annular diaphragm members, may also be made of Hastelloy B or other suitable corrosion resisting metal.

I have also found it advisable in very high temperature services to make valve stem 45 by initially coating the unthreaded stem or the bore of boss 41, or both, with a suitable layer of Stellite and then cutting the required threads in this coating. By providing threads of hard facing material, I reduce the tendency of the stem to gall or seize under high temperature conditions. I have also found it advisable to provide larger than normal clearances for the threads in high temperature services because of the large dimensional changes produced by heat.

The valve of Figures 5–7 has been successfully applied to high temperature high corrosive services up to about 1000° F.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. The term metal as used in the claims is intended to cover alloyed as well as unalloyed metals.

What is claimed and desired to be secured by United States Letters Patent is:

1. In a method of producing a crack free coating of a high melting point hard facing metal of negligible ductility selected from the group consisting of nickel-chromium-boron and cobalt-chromium-tungsten alloys upon a bearing surface of a steel valve member, the steps of depositing in molten condition directly upon said surface an intermediate cooling stress absorbing layer of a ductile elastic metal selected from the group consisting of nickel and predominantly nickel alloys and then depositing in molten condition a layer of said hard facing metal over said intermediate layer when the latter has hardened.

2. In a method of producing a crack free coating of a high melting point hard facing metal of negligible ductility selected from the group consisting of nickel-chromium-boron and cobalt-chromium-tungsten alloys upon a bearing surface of a chrome steel valve body of such complex irregular shape as to produce non-uniform stresses at said surface during cooling after coating with said metal, the steps of depositing in molten condition directly upon said surface an intermediate cooling stress absorbing layer of a ductile elastic metal selected from the group consisting of nickel and predominantly nickel alloys and then depositing in molten condition upon said intermediate layer after the latter has hardened a coating of said hard facing metal.

3. In a method of applying a high melting point hard facing metal of substantially negligible ductility to a bearing surface of a valve member of steel wherein the temperature of said surface is in the vicinity of 1350° F. and above when the coating is applied, and said steel has a transition range at about 500° F. wherein contraction of said valve member in cooling from the coating temperature changes temporarily to expansion and then resumes contraction after passing through said transition range, the step of depositing in molten condition upon said surface an intermediate layer of highly ductile elastic metal selected from the group consisting of nickel and predominately nickel alloys, and then depositing a coating of said hard facing metal in molten condition over said intermediate layer.

4. In a method of protectively coating a steel plug valve body of irregular complex structure and having an internal wall surface and an internal bearing surface subjected to action of line fluid, the steps of depositing in molten condition upon said surfaces a layer of ductile elastic metal selected from the group consisting of nickel and predominantly nickel alloys, and then depositing in molten condition a layer of a hard facing metal selected from the group consisting of nickel-chromium-boron and cobalt-chromium-tungsten alloys over said first layer at said bearing surface.

GEORGE F. SCHERER.

REFERENCES CITED

The following references are of record in the file of this patent:

UNITED STATES PATENTS

| Number | Name | Date |
| --- | --- | --- |
| 2,191,598 | Swartz | Feb. 27, 1940 |
| 2,237,314 | Queneau | Apr. 8, 1941 |
| 2,266,320 | Hobbs | Dec. 16, 1941 |
| 2,277,654 | Merlub-Sobel et al. | Mar. 24, 1942 |
| 2,295,702 | Wissler | Sept. 15, 1942 |
| 2,301,763 | Wagner | Nov. 10, 1942 |
| 2,341,006 | Wissler | Feb. 8, 1944 |
| 2,390,452 | Mudge | Dec. 4, 1945 |
| 2,390,805 | Merryman et al. | Dec. 11, 1945 |

FOREIGN PATENTS

| Number | Country | Date |
| --- | --- | --- |
| 111,409 | Australia | Aug. 28, 1940 |